United States Patent [19]

Wagner et al.

[11] Patent Number: 4,604,271
[45] Date of Patent: Aug. 5, 1986

[54] MAGNESIUM BOROHYDRIDE DIAMMONIATE AND TRIAMMONIATE

[75] Inventors: Ross I. Wagner, Woodland Hills; Louis R. Grant, Los Angeles, both of Calif.

[73] Assignee: The United States of America as represented by the Secretary of the Army, Washington, D.C.

[21] Appl. No.: 781,819

[22] Filed: Sep. 30, 1985

[51] Int. Cl.$^4$ .............................................. C01B 35/00
[52] U.S. Cl. .................................................... 423/286
[58] Field of Search ........................................ 423/286

[56] References Cited

U.S. PATENT DOCUMENTS 2,855,348 10/1958 Huff et al. ............................. 204/59

OTHER PUBLICATIONS

V. N. Konoplev and J. A. Silina, *Zr. Neorg. Khim.*, 30(5), 1125–1128 (1985).
Earl L. Muettertres, *Boron Hydride Chemistry*, Academic Press, New York, 1975, pp. 441 & 445.
V. N. Konoplev, "Synthesis of Magnesium Tetrahydridoborate", *Russian J. Inorg. Chem.*, 25(7), 1980.

*Primary Examiner*—John Doll
*Assistant Examiner*—Jackson Leeds
*Attorney, Agent, or Firm*—Anthony T. Lane; Robert P. Gibson; Freddie M. Bush

[57] ABSTRACT

A direct low temperature process for the preparation of pure magnesium borohydride diammoniate or the deuterated analog thereof based on the addition of 90–95% of the stoichiometric amount of $NH_3$ to an excess of $Mg(BH_4)_2 \cdot X(C_2H_5)_2O$ in a benzene reaction solvent in accordance with equation 1:

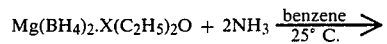

$$Mg(BH_4)_2 \cdot X(C_2H_5)_2O + 2NH_3 \xrightarrow[25^\circ C.]{benzene}$$

$$Mg(BH_4)_2 \cdot 2NH_3 + X(C_2H_5)_2O,$$

wherein X is a numeral from about 2.0 to about 2.5; or when the reaction is conducted in an ether reaction solvent with the same quantities of reactants and under the same experimental conditions, the triammoniate or the deuterated analog thereof is formed in accordance with equation 2:

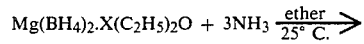

$$Mg(BH_4)_2 \cdot X(C_2H_5)_2O + 3NH_3 \xrightarrow[25^\circ C.]{ether}$$

$$Mg(BH_4)_2 \cdot 3NH_3 + X(C_2H_5)_2O,$$

wherein X is a numeral from about 2.0 to about 2.5. In either case the pure product is readily isolated by filtration, solvent washing to remove excess $Mg(BH_4)_2 \cdot X(C_2H_5)_2O$, and vacuum drying at ambient temperature. Yields are 95–99%; purities are typically about 97%.

3 Claims, No Drawings

MAGNESIUM BOROHYDRIDE DIAMMONIATE AND TRIAMMONIATE

DEDICATORY CLAUSE

The invention described herein was made in the course of or under Contract DAAH01-82-C-A235 or subcontract thereunder with the Government and may be manufactured, used, and licensed by or for the Government for governmental purposes without the payment to us of any royalties thereon.

BACKGROUND OF THE INVENTION

Magnesium borohydride has been the subject matter of reports since about 1950. The preparative methods for magnesium borohydride up to about 1966 are discussed in a report titled, "Chemistry of Boranes IV. On Preparation, Properties, and Behavior Towards Lewis Bases of Magnesium Borohydride" by J. Plesek and S. Hermanek, appearing in Collection Czech. Chem. Comm/Vol. 31/(1966). These earlier reports (listed below) lead one to believe that the compound is now generally available, and comparable to sodium and lithium borohydrides possessing pronouncedly a salt like character (reports 2-6).

1. Barbaras G. D., Dillard C., Finholt A. E., Wartik T., Wilzbach K. E., Schlesinger H. I.: J. Am. Chem. Soc. 73,4585(1951).
2. Wiberg E., Bauer R.: Naturforsch. 5b, 397 (1950).
3. Wiberg E., Bauer R.: Z. Naturforsch. 7b, 58 (1952).
4. Wiberg E., Bauer R.: Chem. Ber. 85,593 (1952).
5. Wiberg E.: Angew. Chem. 65,16(1953).
6. Schrauzer G.: Naturwissenschaften 42,438 (1955).

This is not the case, however, according to J. Plesek, et al. who say "What papers used to call magnesium borohydride—that fact has now been established—were, at best, its adducts with various Lewis bases, or, in a few cases, mere solutions, in which borohydride anions and magnesium cations may be analytically proved. As the case stands, magnesium borohydride has not been hitherto dealt with as a chemical individuum."

J. Plesek, et al. also state in the above report that they found solvates of magnesium borohydride to be more or less readily prepared by all the routes reported, in varying degrees of purity. There is, however, one method only, which they found to afford desolvated magnesium borohydride, namely the following one accounted for by the equation:

$$MgH_2 + B_2H_6 + n(C_2H_5)_2O \rightarrow Mg(BH_4)_2n(C_2H_5)_2O \rightarrow Mg(BH_4)_2 + n(C_2H_5)_2O$$

The adduct of magnesium borohydride with diethyl ether has no definite stoichiometric composition at room temperature. Most conveniently, it is prepared from magnesium hydride (synthesized by the direct combination of elements), and compressed diborane, by allowing the two reactants to stand in diethyl ether at room temperature. Description of properties of the ethereal solution of magnesium borohydride, of its desolvation, and of properties of the desolvated magnesium borohydride, is given under Experimental in the above report. Maximum attained purity amounted to 98 percent.

More recently, the preparation of ether soluble $Mg(BH_4)_2$ in an 85 to 90% yield has been reported by V. N. Konoplev, Russian J. Inorg. Chem. 25(7), 964 (1980). The unsolvated compound is obtained, purportedly, by vacuum pyrolysis of the intermediate liquid dietherate $Mg(BH_4)_2.2(C_2H_5)_2O$ (MBDE).

The magnesium borohydride described hereinabove is required to be transformed to a stable form or to be prepared by another method if it is to have the desired properties of long-term thermal stability as required for a solid gas generator of $H_2$ or $D_2$ for laser applications.

Therefore, an object of this invention is to provide an adduct of magnesium borohydride which has the desired chemical and physical properties for long-term thermal stability.

Another object of this invention is to provide a method for preparing adducts of magnesium borohydride which possess long-term thermal stability.

A further object of this invention is to provide a method for preparing high purity adducts of magnesium borohydride which possess long-term thermal stability and compatibility with an oxidizer salt and binder in a solid gas generator for $H_2$ and $D_2$.

SUMMARY OF THE INVENTION

A low temperature process is disclosed for preparation of pure adducts of magnesium borohydride based on the addition of 1.8–1.9 mols of $NH_3$ per mol of $Mg(BH_4)_2.X(C_2H_5)_2O$ (wherein $X \leq 2$). In a benzene medium magnesium borohydride diammoniate (MBDA) forms as the insoluble product but when the reaction is conducted in an ether medium with the same quantities of reactants and under the same experimental conditions, insoluble magnesium borohydride triammoniate is formed.

From either reaction medium the pure adduct is readily isolated by filtration, solvent washing to remove excess $Mg(BH_4)_2.X(C_2H_5)_2O$, and vacuum drying at ambient temperature. Yields are from about 95 to about 99% with purity levels typically of about 97%.

DESCRIPTION OF THE PREFERRED EMBODIMENTS

A direct low temperature process for the preparation of pure magnesium borohydride diammoniate and pure magnesium borohydride triammoniate is represented by the following process equations 1 and 2:

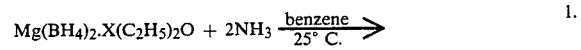

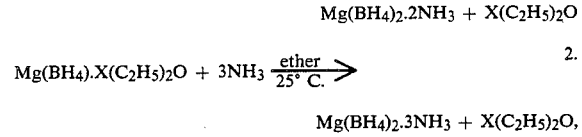

Equation 2 is written as noted based on confirming explanatory data found in Table II which suggests that an equilibrium undoubtedly exists between formation of the ammoniate and the parent etherate. When employing either benzene or ether as the reaction medium and an excess of $Mg(BH_4)_2.X(C_2H_5)_2O$ (wherein $X \leq 2$), yields of the diammoniate and triammoniate adducts, respectively, are obtained in the range of about 95 to about 99 percent with purity levels typically of about 97%.

The starting material for the above conversions to the di- or tri- ammoniates of magnesium borohydride is the solvated product of $Mg(BH_4)_2$ with ether. The ratio of ether/$Mg(BH_4)_2$ is preferably in the range 0.5–3.0 with a ratio of about 2.0 being most preferred when the solvent medium is benzene due to solubility considerations. Ether solvated Mg(BH₄)₂ is obtained by the metathetical reaction or double decomposition of sodium tetrahydridoborate and anhydrous magnesium chloride in diethyl ether:

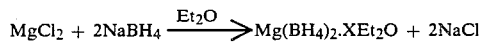
$$MgCl_2 + 2NaBH_4 \xrightarrow{Et_2O} Mg(BH_4)_2 \cdot XEt_2O + 2NaCl$$

The preparation of ether soluble Mg(BH₄)₂ with 33 to 100% excess NaBH₄ as reported by V. N. Konoplev in Russian J. of Inorg. Chem. 25(7), 964 (1980), is achieved in satisfactory yield by ball milling in lieu of high-speed stirring of the virtually insoluble reactants. Data on the synthesis of magnesium borohydride dietherate (MBDE) by the modified procedure is set forth in Table I, below. The failure of the first run subsequently was determined to have been due to the presence of water in the reactants and solvent. Reprocessing of the insoluble fraction of the reaction mixture from run 5 with additional fresh solvent did not produce significant additional MBDE suggesting that the reactants had been spent in an undefined manner (most probably hydrolysis). If the MBDE yield had been limited to approximately 60% by an equilibrium between product and reactants, further reaction would have been expected after removal of the MBDE formed initially.

TABLE I

| | Preparation of Mg(BH₄)₂·2(C₂H₅)₂O | | | | |
|---|---|---|---|---|---|
| Run No. | Reactant, mols | | Ether, Liters | Reaction Time, Hrs | Yield MBDE, %[a] |
| | MgCl₂ | NaBH₄ | | | |
| 1 | 0.525 | 1.586 | 1.0 | 24 | 0 |
| 2 | 0.525 | 1.562 | 1.0 | 66 | 64 |
| 3 | 1.544 | 4.688 | 2.1 | 70 | 58 |
| 4 | 1.586 | 3.687 | 2.1 | 70 | } 59[b] |
| 5 | 2.095 | 6.211 | 3.4 | 64 | |
| (insolubles from run 5) | | | 1.3 | 64 | 2 |
| 6 to 30 | 4.00 | 10.07 | 2.5 | 24 (minimum) | 65[c] |

[a]Based on BH₄⁻ analysis
[b]Yield for combined runs 4 and 5 raised to 61% when secondary recovery from additional processing of run 5 reaction solids is included.
[c]The yields were determined only for combined runs 11-13 and run 16, and were based on product weight only.

In order to prepare a diammoniate, stoichiometric quantities of reactants [or excess Mg(BH₄)₂] must be used and the solvent must be innocuous and selective. Solvent screening tests using Mg(BH₄)₂·2.5(C₂H₅)₂O with a deficiency of NH₃ established that Mg(BH₄)₂·3NH₃ precipitated from diethyl ether solution, Mg(BH₄)₂·2NH₃ from benzene solution, and that the more dense layer of the two-phase system in n-hexane only partially solidified. The upper concentration limit for MBDE in benzene, above which the triammoniate would form (due to increasing ether concentration), was not established. However, it was found that volume ratios of 6:1 benzene/MBDE gave the diammoniate. The preparative data for MBDA is summarized in Table II.

TABLE II

| | Preparation of Magnesium borohydride diammoniate | | | | | | | |
|---|---|---|---|---|---|---|---|---|
| | Reactant, mols | | | | Product | | | |
| Run No. | MBDE | NH₃ | Benzene Ml | NH₃/MBDE Mol Ratio | Yield % | Mg, % | NH₃, % | BH₄⁻, % |
| 1 | 0.00418 | 0.00785 | 20 | 2 | — | — | 38.2 | — |
| 2 | 0.323 | 0.615 | 500 | 2 | 99.1 | 27.7 | 38.6 | — |
| 3 | 3.14 | 6.00 | 5200 | 2 | 99.5 | 29.3 | 38.8 | 33.9[a] |
| 4 | >7.4[b] | <26.6[c] | 6000 | 1.84 | — | 32.1 | 41.3 | 34.4[d] |
| | | | | 1.69 | | 27.7 | 32.8 | — |
| 5 | 10.5 | 16.2 | 6000 | 2.16 | — | 27.3 | 43.0 | — |
| 6 | 8.76 | 12.0 | 2800 | 1.92 | 96 | 28.6 | 38.5 | 33.1[e] |
| 7 | 9.00 | 15.3 | 3800 | 1.95 | 95 | 28.6 | 39.0 | 32.0[d] |
| 8 | 9.58 | 15.7 | 3700[f] | 1.88 | 93 | 28.5 | 37.5 | 34.9[d] |
| 9 | 11.1[g] | 20.3 | 6000[g] | 1.91 | 128[h] | 29.4 | 39.1 | 33.5 |

[a]calculated from AAS boron analysis
[b]The material partially solidified, which suggested an ether/Mg ratio <2; 0.725 liters (C₂H₅)₂O was added to effect dissolution in benzene
[c]The quantity added is unknown due to a significant loss of NH₃ through the pressure-relief bubbler
[d]Calculated from H₂ obtained on acid hydrolysis
[e]Basic iodate procedure
[f]The filtrate from run 7 was used in lieu of benzene
[g]Estimated amounts in recovered filtrates from previous runs
[h]Based on ammonia added; the filtrates used as solvent presumably contained several moles of soluble Mg(BH₄)₂·xNH₃·y(C₂H₅)O In those instances wherein some higher ammoniates were also formed, it was possible to induce a redistribution reaction by treatment with MBDE in a benzene solution.

EXPERMENTAL

Reagents

Anhydrous magnesium chloride was purchased from either Aldrich or Ventron and used as received. The MgCl₂ purity ranged from 99% (Aldrich, prepared from the elements) to 93% (Ventron, reportedly prepared by dehydration of the hexahydrate). Sodium borohydride (98%, Ventron), was dried in a vacuum oven for 3 hours at 100. Benzene (Baker, reagent) was dried over P₂O₅ (Baker, Granusic). Diethyl ether (Mallinkrodt, AR) and ammonia (Matheson) were used as received.

Apparatus

The reactor used to prepare MBDE was a ball mill fabricated from a 12-liter round bottom flask by converting the spherical shape to a cylinder of 22 cm diameter by 15 cm length with approximately hemispherical ends. To lift the balls, the cylindrical surface had eight equally spaced 8 mm indentations parallel to the axis of rotation of the cylinder. Each end of the ball mill carried a 58 mm tube that rested in a ball bearing assembly welded to the rim of a water bath that was used to heat the ball mill. One end was terminated in a medium fritted glass filter capped at the discharge end. The other end was terminated in a No. 50 o-ring joint used both to charge the mill and also to connect it subsequently to the rotary drive mechanism. The connection between the ball mill and drive incorporated a stainless-steel bellows that effected a seal while the drive torque was transmitted around the bellows from three radial pins to three pins oriented parallel to the axis of rotation. The ball mill was driven at approximately 100 rpm by the motor of a rotary evaporator which had the condenser ($-10°$ C.) modified so that the solvent returned to the ball mill.

The reactor used to convert the intermediate MBDE to MBDA was a 12-liter round bottom flask modified by addition of a medium fritted glass filter at a 90-degree orientation to the flask neck. The neck of the flask carried a 45-degree adapter through which a rotatable gas inlet tube entered and which carried a short Vigreux column with ice-cooled reflux condenser.

Magnesium Borohydride Dietherate (MBDE)

In a nitrogen-filled glovebox, 381 g (4.00 mols) $MgCl_2$, 381 g (10.1 mols) $NaBH_4$, and 2.5 liters diethyl ether were added to the ball mill, which carried a 5-pound charge of 6 mm glass balls. The loaded mill then was positioned horizontally in the bearing assembly of the water bath, connected by means of a clamp to the rotary drive, and rotated at 95 rpm under reflux to effect reaction. The mill was vented to atmospheric pressure in a hood through a 10-foot length of 0.250-inch tubing. The characteristic odor of diborane and white deposits were noted at the vent. After 24 hours (longer reaction times did not improve the yield), the mill was disconnected from the rotary drive and quickly capped.

Filtration of the reaction slurry proved to be impractically slow and had the disadvantage that the mill had to be cleaned between runs in order to recover the balls. An alternate procedure, wherein the mill was capped with a nitrogen-filled 5 liter round bottom flask, was used. A disk of 8 mesh stainless steel screen placed in the No. 50 o-ring joint retained the 6 mm balls during transfer of the reaction slurry from the mill, which then could be recharged without cleaning. Slurries which were produced when 98% $MgCl_2$ was used were thin and poured readily; those from 93% $MgCl_2$ were thick and difficult to pour; and that from 75% $MgCl_2$ was a thick paste transferable only after dilution with ether (no MBDE could be isolated from this reaction mixture).

The MBDE is separated from the 2.5 liters of slurry by decantation (four times) after dilution to 5 liters with ether. All transfers are made pneumatically under dry nitrogen. The ether is stripped on a rotary evaporator at atmospheric pressure from the combined supernatant solutions and recycled.

The MBDE is isolated by vacuum stripping the distillation residue at 50° C. and 20 torr. The liquid product is analyzed for borohydride by the basic iodate procedure. Found, 12.1 to 14.7% $BH_4^-$; calculated for $Mg(BH_4)_2.2(C_2H_5)_2O$, 14.68%, $BH_4^-$. When additional ether was stripped from the product at 50° C. and 9 torr, partial solidification occurred. The solid isolated by trituration with benzene and filtration was analyzed for borohydride by acid hydrolysis. Found, 31.0% $BH_4^-$; calculated for $Mg(BH_4)_2.0.546(C_2H_5)_2O$, 31.0% $BH_4^-$.

Magnesium Borohydride Triammoniate

In one chamber of a double-chambered apparatus, a filtered solution of 1.0 g $Mg(BH_4).2.5(C_2H_5)_2O$ (4.18 mmols) in 20 milliliters of diethyl ether was contacted with 174.2 cc (7.78 mmols) of gaseous $NH_3$ using conventional high-vacuum techniques. The resulting precipitate was isolated on the medium fritted filter separating the two chambers and washed three times by solvent distilled back from the filtrate. Analysis of the filtrate for magnesium, after hydrolysis, by Atomic Absorption Spectrometry (AAS) showed 1.73 mg-atoms, which suggested the $NH_3/Mg$ ratio in the solid to be 3.17. The solid was analyzed for $NH_3$ by the micro-Kjeldahl technique. Found 48.6% $NH_3$; calculated for $Mg(BH_4)_2.3NH_3$, 48.62% $NH_3$.

Magnesium Borohydride Diammoniate (MBDA)

An experiment virtually identical to that used to prepare $Mg(BH_4)_2.3NH_3$ was conducted, except that benzene was used as the solvent. The reactants used were 1.0 g of $Mg(BH_4)_2.2.5(C_2H_5)_2O$ (4.18 mmols) and 175.9 cc $NH_3$ (7.85 mmols). The filtrate contained 0.39 mg-atoms Mg suggesting a $NH_3/Mg$ ratio of 2.07 in the solid. Found, 38.2% $NH_3$; calculated for $Mg(BH_4)_2.2NH_3$, 38.6% $NH_3$.

Using substantially the same type apparatus and techniques, the reaction was scaled up using 3.14 mols MBDE in 5.2 liters benzene and 6.00 mols $NH_3$ to give MBDA in a 99.5% yield. The analytical results on this material were as follows: Found, Mg, 29.3%, $NH_3$, 38.8%, B, 24.7%; Na, 0.31%; Cl, 4.0%. Calculated for $Mg(BH_4)_2.2NH_3$: Mg, 27.61%; $NH_3$, 38.68%; B, 24.55%.

Conventional laboratory techniques were used in further scaling the MBDA synthesis. A typical reaction is described. In a nitrogen-filled glovebox, 1770 g MBDE (not analyzed but assumed to be 8.76 mols) is diluted to 5 liters with benzene and pressure filtered. The filtrate is transferred to a 12 liter reactor and gaseous $NH_3$ from a cylinder on a balance is introduced over the surface of the magnetically stirred solution at a rate of approximately 1.5 g/min. Formation of a surface precipitate is immediate, but dissolution in the vortex is rapid for approximately 5 minutes. After about 1 hour, the NH3 addition is interrupted and the hot ($\sim 60°$ C.) slurry is pumped to remove the free ether, which is collected in a $-78°$ C. trap. Most of the benzene vapor is refluxed from a 0° C. condenser attached to the 12 liter reactor. When the temperature had fallen to ambient or lower, pumping was stopped and $NH_3$ addition was resumed. A total of 204 g $NH_3$ (12.0 mols) was added. The mixture was allowed to stir for 3.5 hours, while cooling to ambient under a nitrogen atmosphere. The slurry was pressure filtered and the solid was washed twice with 750 ml benzene under nitrogen and dried by pumping to $5 \times 10^{-3}$ torr at ambient temperature. The yield was 509 g (5.78 mols), which represented a 96% yield.

The product gave the following analyses: Found, Mg, 28.6%; $NH_3$, 38.5%; $BH_4^-$, 33.1%, Na, 0.57%; Cl, 0.80%. Calculated for $Mg(BH_4)_2.2NH_3$: Mg, 27.61%; $NH_3$, 38.68%; $BH_4^-$, 33.71%.

A thermally stable magnesium borohydride diammoniate prepared by the process of this invention has been tested in combination with an oxidizer selected from $KNO_3$ and $LiNO_3$ and a binder of polytetrafluoroethylene (Teflon) to perform as a $H_2$ generator for laser uses. A preferred composition containing 85% magnesium borohydride diammoniate, 7.5% $LiNO_3$, and 7.5% polytetrafluoroethylene possessed high crush strength in pellet form, a requirement of the physical integrity of gas generator pellets, and a $H_2$ weight percent yield exceeding 12 percent when test fired using 0.5 and 1.0 inch-diameter pelletized composition in 100 to 600 grams test firings.

The preparation of $Mg(BD_4)_2.2ND_3$ and $Mg(BD_4)_2.3ND_3$ to give a pure deuterium generator would involve the use of $ND_3$ rather than $NH_3$ and $NaBD_4$ rather than $NaBH_4$ in the examples given under the "Description of The Preferred Embodiment", hereinabove.

We claim:

1. A process for the conversion of magnesium borohydride dietherate or the deuterated analog dietherate thereof to the thermally stable compound magnesium borohydride di- or tri- ammoniate or the deuterated analogs thereof comprising:

(i) providing a stoichiometric excess amount of a dietherate selected from the group consisting of

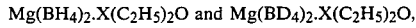

wherein D is deuterium and X is a numeral ranging from about 2 to about 2.5, in a reaction solvent selected from benzene and diethyl ether, said reaction solvent being benzene when said dietherate is to be converted to $Mg(BH_4)_2.2NH_3$, $Mg(BD_4)_2.2NH_3$ or $Mg(BD_4)_2.2ND_3$ said reaction solvent being diethyl ether when said dietherate is to be converted to $Mg(BH_4)_2.3NH_3$, $Mg(BD_4)_2.3NH_3$ or $Mg(BD_4)_2.3ND_3$;

(ii) contacting said dietherate in said reaction solvent with an amount from about 90 to about 95% of the stoichiometric amount of gaseous ammonia or its deuterated analog to form a precipitated solid compound which is magnesium borohydride di-or tri-ammoniate or the deuterated analogs thereof;

(iii) separating said precipitated solid compound and washing said precipitated solid compound with said reaction solvent which is diethyl ether when said precipitated solid compound is magnesium borohydride triammoniate or the deuterated analogs thereof and washing said precipitated solid compound with said reaction solvent which is benzene when said precipitated solid compound is magnesium borohydride diammoniate or the deuterated analog thereof; and, (iv) recovering said magnesium borohydride di- or tri-ammoniate or the deuterated analogs thereof and drying under vacuum at ambient temperature.

2. The process of claim 1 wherein said X of said $Mg(BH_4)_2.X(C_2H_5)_2O$ or said $Mg(BD_4)_2.X(C_2H_5)_2O$ has a numeral value equal to about 2.5 and wherein said amount of about 4.18 millimoles of said $Mg(BH_4)_2.2.5(C_2H_5)_2O$ or said $Mg(BD_4)_2.2.5(C_2H_5)_2O$ is contained in about 20 milliliters of the reaction solvent diethyl ether, said stoichiometric amount of gaseous ammonia or its deuterated analog employed in said contacting step is about 7.78 millimoles using high-vacuum techniques, and wherein said precipitated solid compound separated is $Mg(BH_4)_2.3NH_3$ or the deuterated analogs, $Mg(BD_4)_2.3NH_3$ or $Mg(BD_4)_2.3ND_3$.

3. The process of claim 1 wherein said X of said $Mg(BH_4)_2.X(C_2H_5)_2O$ or said $Mg(BD_4)_2.X(C_2H_5)_2O$ has a numeral value equal to about 2.5 and wherein said amount of about 4.18 millimoles of said $Mg(BH_4)_2.2.5(C_2H_5)_2O$ or said $Mg(BD_4)_2.2.5(C_2H_5)_2O$ is contained in about 20 milliliters of the reaction solvent benzene, said stoichiometric amount of gaseous ammonia or its deuterated analog employed in said contacting step is about 7.85 millimoles using high-vacuum techniques, and wherein said precipitated solid compound separated is $Mg(BH_4)_2.2NH_3$ or the deuterated analogs, $Mg(BD_4)_2.2NH_3$ or $Mg(BD_4).3ND_3$.

* * * * *